United States Patent [19]

Goscenski, Jr.

[11] 4,433,764
[45] Feb. 28, 1984

[54] CLUTCH-BRAKE ASSEMBLY

[75] Inventor: Edward J. Goscenski, Jr., Battle Creek, Mich.

[73] Assignee: Eaton Corporation, Cleveland, Ohio

[21] Appl. No.: 299,454

[22] Filed: Sep. 4, 1981

[51] Int. Cl.$^3$ ............................................. F16D 11/06
[52] U.S. Cl. .................................. 192/18 R; 192/93 A
[58] Field of Search ................. 192/18 R, 18 A, 18 B, 192/14, 12 R, 17 R, 93 A; 56/11.3, 11.8, 11.7

[56] References Cited

U.S. PATENT DOCUMENTS

| | | | |
|---|---|---|---|
| 2,985,992 | 5/1961 | Dowdle | 192/18 R |
| 3,245,505 | 4/1966 | Staengle et al. | 192/12 R |
| 4,041,679 | 8/1977 | Seifert et al. | 192/18 R |
| 4,122,652 | 10/1978 | Holtermann | 192/18 R |
| 4,205,737 | 6/1980 | Harkness et al. | 192/17 R |
| 4,213,521 | 7/1980 | Modersohn | 192/18 R |
| 4,286,701 | 9/1981 | MacDonald | 192/18 R |
| 4,330,054 | 5/1982 | MacDonald | 192/18 R |
| 4,351,424 | 9/1982 | Lawrence et al. | 192/18 R |
| 4,362,004 | 12/1982 | Rush et al. | 192/18 R |

Primary Examiner—George H. Krizmanich

Attorney, Agent, or Firm—C. H. Grace; L. J. Kasper

[57] ABSTRACT

A clutch-brake assembly adaptable for use in a lawn mower having a rotary blade. The assembly is fully enclosed by a housing (34) secured to the engine. Drive shaft (14) of the engine rotates the input member (20) via keys (22). A conical annular ring (74) has an annular surface (106) engageable with surface (110) of member (20) to rotate output member (28) and the attached blade (90). Self-energizing camming surfaces (80, 82) are employed to insure one-to-one drive between the input and output members. Springs (84) are used to bias ring (74) into engagement with member (20). An axially movable braking ring (54) with limited rotational movement relative to housing (34) is engageable with an annular surface (108) of ring (74). Movement of ring (54) is caused by springs (70) and ramping surfaces similar to those of (80, 82). The assembly employs the same oil used in the reservoir of the engine. Unique connecting means (36) are employed to reduce nonrotatable loads on shaft (14). Output shaft portion (88) is bushed in housing (34) in a manner to reduce nonrotating loads on shaft (14).

19 Claims, 8 Drawing Figures

CLUTCH-BRAKE ASSEMBLY

BACKGROUND OF THE INVENTION

This invention relates to power transmission wherein an operator may direct power to be transmitted from a power source to a drive member upon actuation of a device and upon release of the device the operator may disable the power transmission and simultaneously brake the driven member. The invention finds particular utility for use in the drive train of a power lawn mower between the engine and the blade.

Power lawn mowers of the horizontal rotary blade type are operated by users of differing age, prudence, and mechanical aptitude. The mowers are used on lawns of various configurations and elevations. Occasionally, such users lose control of the mower by inattention, loss of balance, or poor footing. Under such circumstances, it is possible for the mower to roll by its inertia or due to lawn elevation in such a manner as to injure the user. Further, through inattentiveness or lack of common sense, users have been known to insert hands and feed within the housing containing the rotating blade. The U.S. Government, through a study, has recognized such users should either be protected from themselves or the inherent dangers of operating such mowers and has, accordingly, mandated the need for a lawn mower clutch brake assembly on all horizontal rotary blade type mowers. In view of this mandate and the need for a clutch brake assembly which will meet U.S. Government standards, applicant has conceived of the following invention.

SUMMARY OF THE INVENTION

Objects of the invention are to provide a clutch brake assembly:

(a) which may be actuated from a remote location with an acceptable amount of force to provide an adequate braking action;

(b) which will be either engaged to an input drive or to a brake and will have an unstable operating condition between said operating modes (c) which is relatively small;

(d) that will be relatively immune to surrounding environmental conditions;

(e) which is normally in a braking mode and must be actuated to a drive mode;

(f) which can be packaged with a driving engine with few modifications to the engine;

(g) with few movable parts located externally of the housing enclosing the clutch-brake assembly.

(h) which has a smooth engagement characteristic to prevent engine stall;

(i) which has few maintenance requirements (j) which creates small loads on the driving engine input shaft;

(k) which absorbs impacts from loads exerted on the output portion of the clutch-brake assembly; and/or (l) which is reliable and relatively inexpensive.

The present invention is directed toward a wet clutch brake assembly having a conical friction member having a cam surface engaged with a corresponding cam surface on a rotatable output member for movement toward and away from the output member in response respectively to movement of a rotatable and axially movable annular brake member toward and away from the output member, the brake member being capable of movement away from the output member a distance to allow engagement of the friction member with a rotatable input member to cause one-to-one rotation between the input and output members and movement toward the output member a distance to disengage the friction member from the input member and engage the friction and brake members and thus lock the output member relative to the brake member. Biasing means are provided to move the brake member toward the output member and means to overcome the biasing force of the biasing means are provided to move the brake member away from the output member.

BRIEF DESCRIPTION OF THE DRAWINGS

FIG. 1a is an enlargement of a portion of FIG. 1.

DETAILED DESCRIPTION OF THE DRAWINGS

Figure 1:
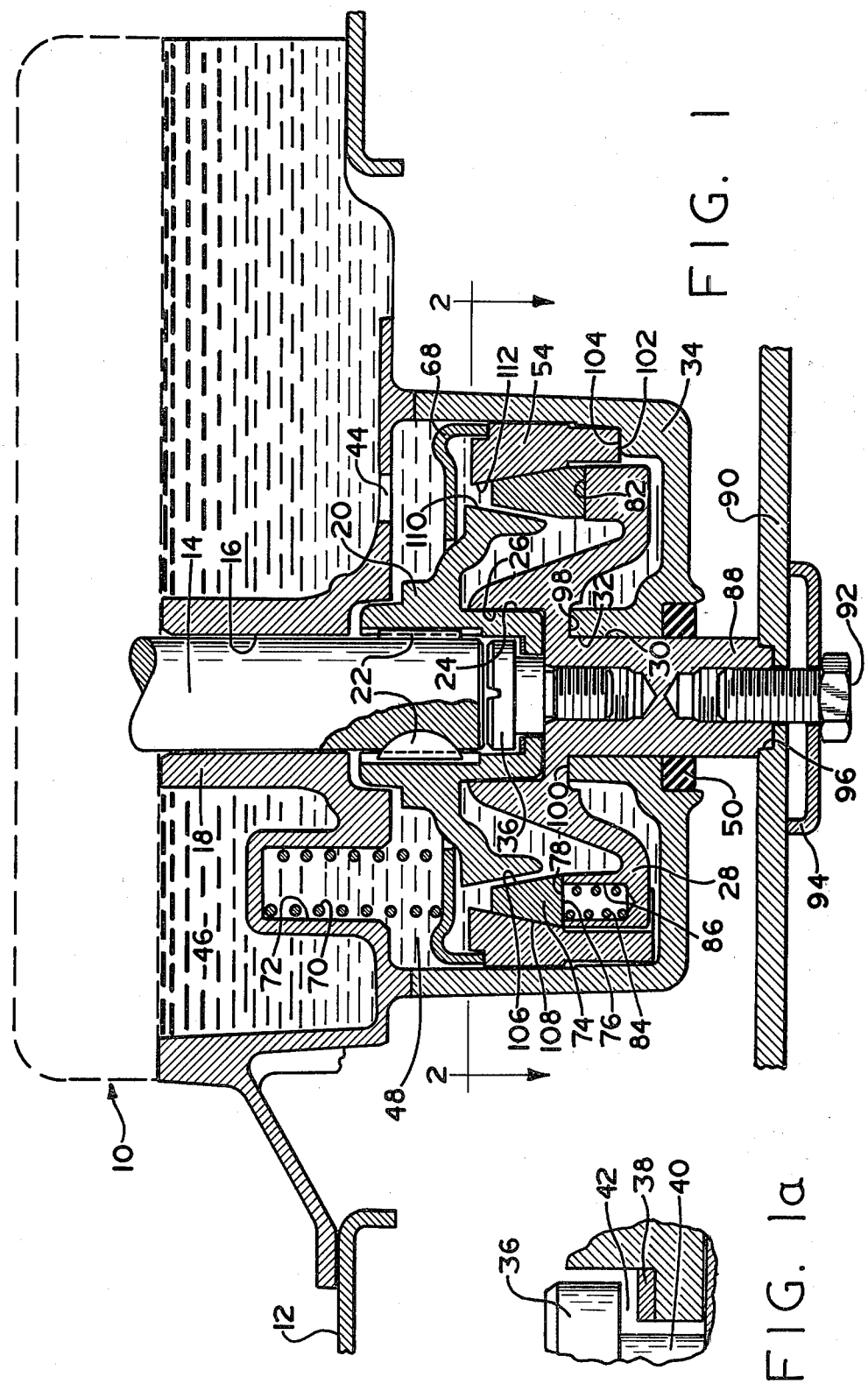
FIG. 1 is a sectional view taken along line 1—1 of FIG. 2 illustrating the clutch-brake assembly in the braking mode.

The driving portion of a hand propelled rotary lawn mower is illustrated in part in FIG. 1 by an engine 10 supported on a circular frame 12. The engine, schematically illustrated includes a drive shaft 14 which projects through an opening 16 in an engine housing 18. The engine may be of the internal combustion type and operates to rotate drive shaft 14.

Drive shaft 14 is connected to an input member 20 via two Woodruff Keys 22 in a known manner to provide one to one rotation between shaft 14 and member 20. Keys 22 further allow input member 20 to move axially on shaft 14. Member 20 includes a journalled cylindrical surface 24 engaging a mating surface 26 on an output member 28. The surfaces provide alignment of and permit rotation between members 20 and 28. It is contemplated that an appropriate bushing or the like, may be used in place of the surfaces 24 and 26.

Figure 2:
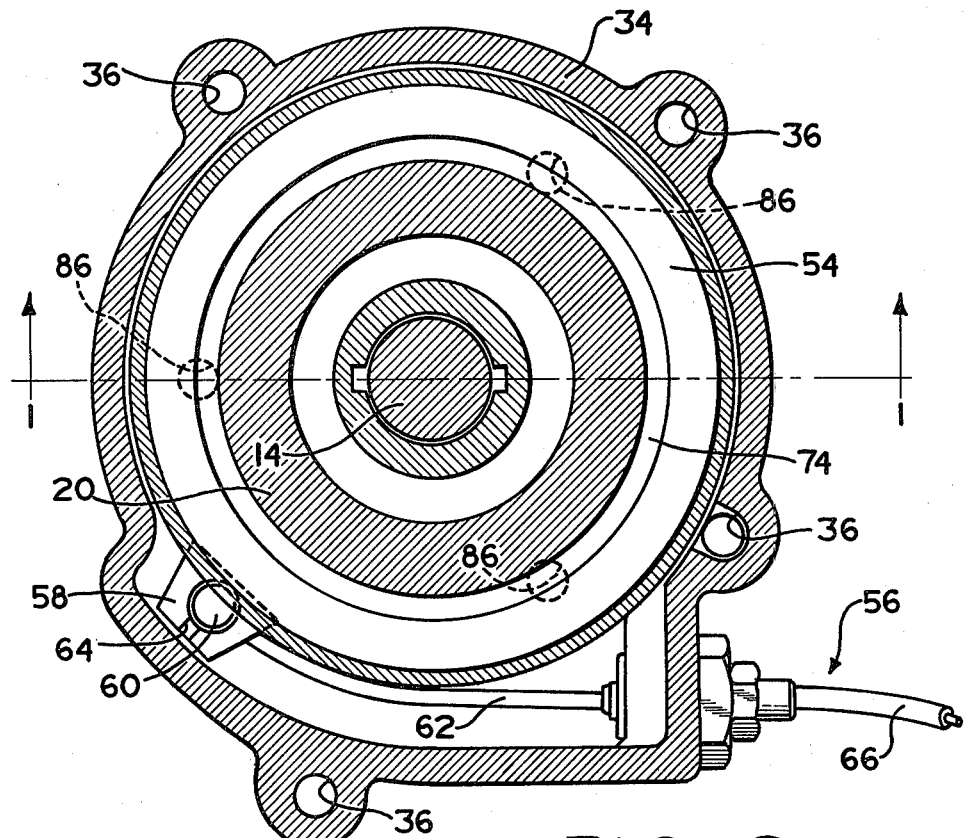
FIG. 2 is a sectional view taken along line 2—2 of FIG. 1 illustrating the entire assembly.

Output member 28 includes a second journalled cylindrical bearing surface 30 engaged with a mating bearing surface 32 in a clutch-brake assembly housing 34 to provide alignment and rotation of member 28. Surfaces 30 and 32 absorb nonaxial loads on member 28 thus preventing such loads from being transmitted to shaft 14. Housing 34 is secured to engine housing 18 by a plurality of bolts, not shown, projecting through openings 36 (FIG. 2). If desired, an appropriate bushing, or the like, may be employed instead of the journalled surfaces 30 and 32.

A thrust screw retaining means 36 secures members 20 and 28 to one another via a threaded engagement. The thrust screw makes contact with member 20 through a thrust washer 38 and includes a shoulder 40 which contacts member 28. The shoulder is constructed to insure a space 42 for axial movement of members 20 and 28 relative to one another. In the braking mode illustrated in FIGS. 1 and 1a space 42 exists between the head of screw 36 and washer 38.

A passage 44 (FIG. 2) is provided for oil to flow between the engine oil reservoir 46 and the oil chamber 48 defined by housings 18 and 34. Housings 18 and 34 are constructed to insure the retention of engine oil in reservoir 46 and chamber 48. To insure such retention, an appropriate seal 50 is provided between housing 34 and output member 28. An appropriate oil fill passage may be provided for introducing oil to reservoir 46 and chamber 48. In use, both the reservoir and chamber are filled with the same oil.

An annular brake ring 54 is provided in encircling relationship to output member 28 and can rotate between limits within housing 34. Means 56 are used to rotate ring 54 within housing 34. These means are illustrated in the form of an ear 58 secured to ring 54. An appropriate cylinder 60 connected to a cable 62 in a known manner and secured to ear 58 via a slot 64 is used to rotate ring 54. Cable 62 extends exterior of housing 34 through tubing 66. Movement of cable 62 within tubing 66 results in rotation of ring 54 relative to housing 34.

Appropriate means are used to bias ring 54 downwardly in FIG. 1. These means are shown in the form of a biasing ring 68 biased by three coil springs 70, only one shown, each having one end located in a pocket 72 of housing 18 and the other end in contact with ring 68. Ring 68 is in circular contact with brake ring 54.

Figure 4:
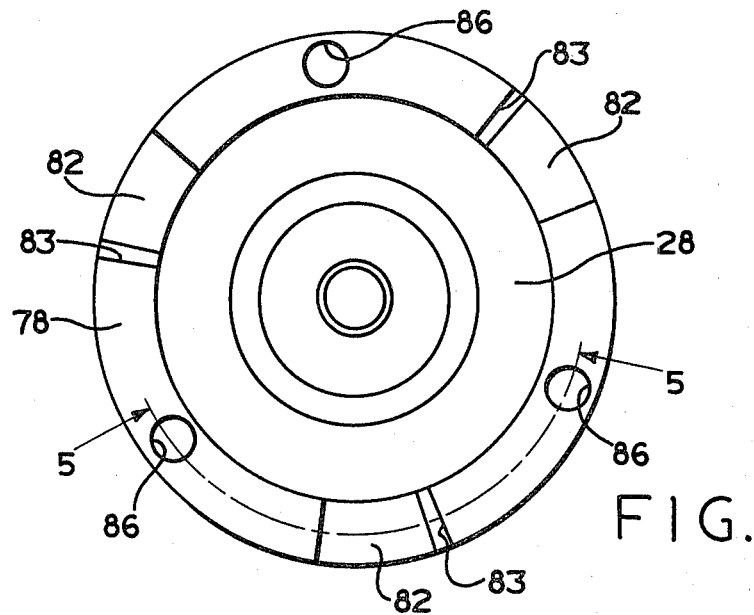
FIG. 4 is a top plan view of the center portion of the assembly illustrating the top surface of the output member.
Figure 5:
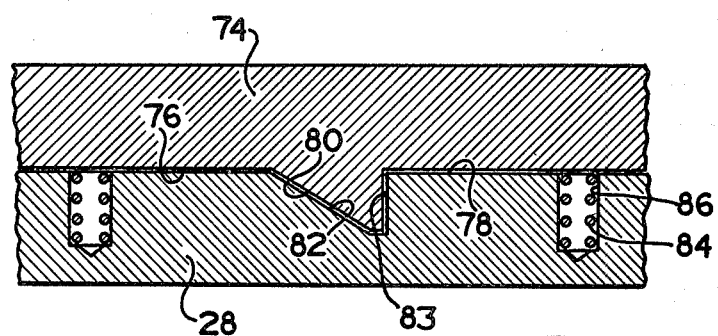
FIG. 5 is a layout taken along line 5—5 of FIG. 4 illustrating the engagement of the cone ring and output member at the braking mode.
Figure 6:
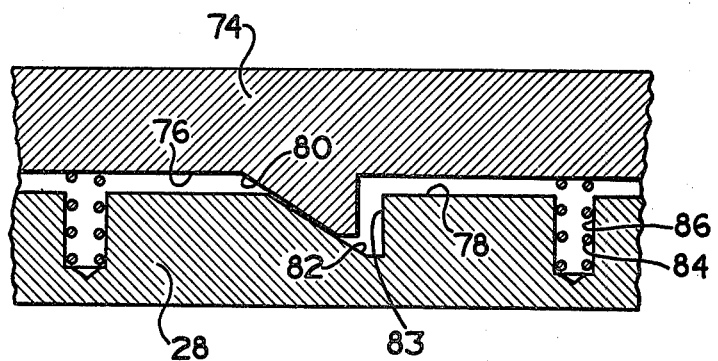
FIG. 6 is a layout similar to FIG. 5 illustrating the cone member and the output member in the driving mode.

The clutch-brake assembly also includes an annular conical ring friction member 74 having a lower surface 76 juxtaposition to a top surface 78 of output member 28. As best seen in FIGS. 4–6 surface 76 includes a plurality of ramp surfaces 80 in mating engagement with corresponding surfaces 82 in member 28. Rotation of ring 74 relative to member 28 results in axial movement of ring 74 relative to member 28 as a result of ramp surfaces 80 and 82. Surfaces 83 on member 28 prevent rightward movement of ring 74 as illustrated in FIG. 5. In the preferred embodiment, three ramp surfaces 80 and 82 are employed. A plurality of springs 84 located in pockets 86 of output member 28 are used to bias ring 74 axially away from member 28.

Secured to the output shaft portion 88 of output member 28 is a rotary blade 90. Securement is provided via a bolt 92 and an appropriate washer 94. Blade 90 includes a slot 96 which matingly engages a rectangular projection on shaft portion 88. Other methods of connecting blade 90 to shaft portion 88 are contemplated.

In a typical embodiment wherein a lawn mower employs a 3½ hp engine and a 22 inch rotary blade 90, springs 70 are chosen to create a total load of about 100 lbs. forcing ring 68 away from housing 18. Springs 84 in such an application are chosen to create about a 40 lb. load forcing ring 74 away from member 28. Appropriate thrust surfaces 98 and 100 are respectively provided on output member 28 and housing 34 to absorb the load created by the springs 70.

In a manner similar to that shown in FIGS. 5 and 6, appropriate ramp surfaces are provided on the lower portion 102 of ring 54 and surface 104 of housing 34. These ramp surfaces provide for axial movement of ring 54 against the force of springs 70 upon rotation of ring 54 relative to housing 34 in one direction. Surfaces similar to surfaces 83 in FIGS. 5 and 6 are also provided to limit movement of ring 54 relative to housing 34 in the direction facilitating braking. Upon rotation of ring 54 in the opposite direction, the force of springs 70 overcomes the force of springs 84 thus allowing ring 54 to move in the opposite axial direction. As noted, the ramp surfaces 102 and 104 may be identical to ramp surfaces 80 and 82.

Figure 3:
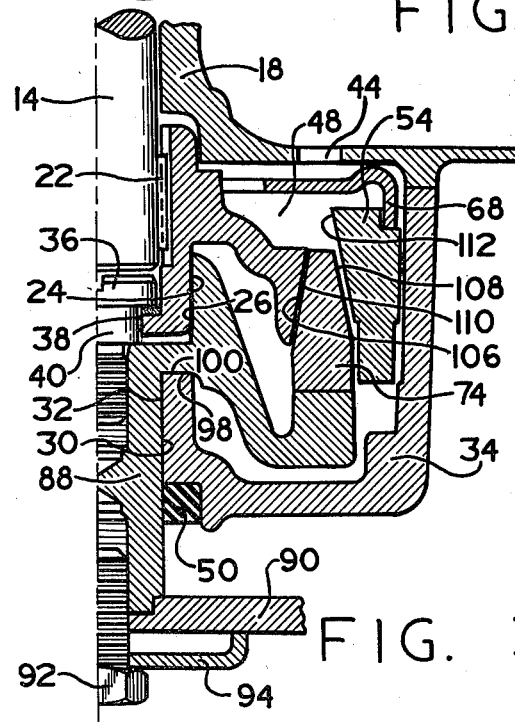
FIG. 3 is a fragmentary view of a portion of FIG. 1 illustrating the assembly in a driving mode.

Ring 74 has opposed angled surfaces 106 and 108. Surface 106 corresponds for mating engagement with angled annular surface 110 on input member 20 as illustrated in FIG. 3 while surface 108 corresponds for mating engagement with angled annular surface 112 on brake ring 54 as illustrated in FIG. 1. Preferably, surface 106 engages surface 110 360 degrees. Similarly, surface 108 engages surface 112 360 degrees. The surfaces 106 to 112 are preferably at an angle of about 11 degrees relative to the axis of rotation of shaft 14. Other angles for the wet clutch are contemplated.

Referring now to the operation of the clutch-brake assembly, in its unactuated mode (FIG. 1) springs 70 force biasing ring 68 downwardly moving brake ring 54 to its lower most position. Such movement overcomes the force of springs 84 and results in engagement of surfaces 108 and 112. This engagement results in braking action between brake ring 54 and output member 28 to retard rotation of shaft portion 88 and, accordingly, blade 90. In its downward position surfaces 106 and 110 are spaced from one another thereby preventing torque transfer via such surfaces from input member 20 to ring 74. Assuming rotation of drive shaft 14, input member 20 is rotated by keys 22. In the position of FIG. 1, sliding engagement occurs between surfaces 24 and 26. This engagement is inadequate to transfer rotational torque from input member 20 to output member 28 in view of the frictional engagement existing between surfaces 108 and 112.

As a result of the space 42 between members 20 and 28 and the presence of shoulder 40, input member 20 is free to move downwardly in FIG. 1. This downward movement prevents the transfer of torque from member 20 to member 28. It is important to allow for space 42 to prevent the transfer of torque between members 20 and 28.

Upon movement of cable 62 to the right in FIG. 2, brake ring 54 is rotated counterclockwise and, accordingly, ramps up on ramp surfaces 102 and 104 causing the brake ring to move upwardly in FIG. 1 to the position illustrated in FIG. 3. This movement overcomes the force of springs 70. With upward movement of brake ring 54, springs 84 force ring 74 into the upward position into engagement with member 20. This upward engagement causes a transfer of rotational torque between surfaces 106 and 110. As a result of the conical fluid clutch action between these surfaces, a relatively gradual, about one second, transfer of rotational energy is transmitted from member 20 to member 28 resulting in a one-to-one rotation between these two members. As this rotation is occurring, as illustrated in FIG. 6, a self-energizing action is occurring with respect to surfaces 80 and 82 causing the further locking and engagement of surfaces 106 and 110. This self-energizing feature caused by surfaces 80 and 82 insures complete one-to-one engagement between members 20 and 28.

Figure 3A:
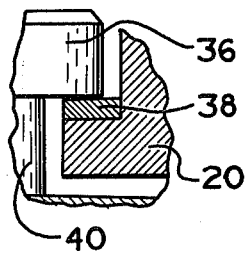
FIG. 3a is an enlargement of a portion of FIG. 3.

As seen in FIGS. 3 and 3a, member 20 is moved axially upwardly forcing washer 38 into contact with the head of screw 36. This upward movement results in the relocation of space 42 to a position between member 20 and member 28.

Upon the release of the rightward force on cable 62 in FIG. 2, springs 70 overcome the force of springs 84 resulting in the disengagement of surfaces 110 and 106 and a movement of brake ring 54 to the downward position shown in FIG. 1. This results in a braking force being exerted on cone ring 74 and, accordingly, output member 28 causing output member 28 and, accordingly, blade 90 to stop rotating. This braking action occurs in less than 3 seconds.

In the braking mode (FIG. 1), the mechanism is so constructed as to transmit force from surface 112 to surface 108 to ring 74 to output member 28 to housing 34 through spring 70 to biasing ring 68 to brake ring 54 and back to surface 112. This force transmittal path results in no forces being transmitted to shaft 14. This arrangement is beneficial since it reduces unnecessary wear on the operating engine components. Similarly, in a drive mode (FIG. 3), forces are transmitted from surface 110 to surface 106 to ring 74 to output member 28 through shoulder 40 to screw 36 through thrust washer 38 into input member 20 and back to surface 110. Only rotational drive forces are transmitted to shaft 14. Further, as a result of the construction, neither a disconnect nor an intermediate mode between the brake and drive modes exists. This is important to insure that the assembly is either in a driving or a braking mode during operation.

It can be seen in both the driving and braking modes that shaft 14 is not loaded as a result of the clutch-brake assembly construction. This arrangement is very advantageous since unnecessary forces are not transmitted to the internal engine components. The screw 36, thrust washer 38, shoulder 40, and space 42 are so designed to reduce power loss within the clutch-brake assembly. During the drive mode, no power losses are transmitted through washer 38 since the input and output members are rotating at the same speed. During braking, no force is transmitted through washer 38 as a result of space 42. During approximately 1 second between the brake and drive modes power is transmitted through the washer 38 but this transmittal is over a relatively short duration and causes minimal detrimental action to the clutch-brake assembly.

Further, it can be seen that any impact loads, for example along the line of blade 90, are absorbed between surfaces 30 and 32 thus transmitting these loads to housing 34 rather than to shaft 14. This again reduces unnecessary loading on the engine components.

Further, as a result of surfaces 30 and 32 as well as surfaces 24 and 26, unnecessary rocking of shaft portion 88 is prevented. As a result of this construction, these surfaces may be journalled or bushed inexpensively rather than by applying more expensive antifriction bearing means.

As a result of the construction, tolerances can also be better controlled since the clutch-brake assembly is mounted directly to the engine rather than circular frame 12 of the lawn mower housing. This prevents misalignment of parts during assembly and skewing during operation.

Further it can be seen that all internal components of the clutch-brake assembly are enclosed by housings 34 and 18. This minimizes exterior environmental effects on the clutch-brake assembly. It further allows for the use of a wet clutch-brake drive. Such an arrangement insures more consistent operation over assemblies employing a dry clutch-brake.

Although the clutch-brake assembly has been shown in combination with a lawn mower, the arrangement is also readily adaptable to other assemblies requiring similar force transmittal between a driving shaft 14 and a driven output shaft portion 88 and positive braking on demand.

What is claimed is:

1. A clutch-brake assembly for controlling the transmission of power between a source such as an engine, a use element such as a rotating blade, and a support element such as a frame, comprising, in combination with oil: a housing adapted to be secured to said support element and retain said oil; an input member located within said housing, mounted for rotation about an axis, adapted to be secured to said source for driving rotation, and having a clutching surface; an output member mounted for rotation about said axis and having a cam surface facing said clutching surface; a friction member located within said housing and having a friction surface juxtaposition said clutching surface and a cam surface engaging said cam surface of said output member whereby rotational movement of said friction member and said output member relative to one another will result in axial movement of said friction member relative to said output member; a brake member in said housing having a braking surface juxtaposition said friction surface and mounted for axial movement with respect to said housing a distance to engage said braking and friction surfaces and move said friction surface out of engagement with said clutching surface; means axially biasing said friction member toward said input and braking members and away from said output member; means axially biasing said brake member toward said friction member; and means to move said brake member away from said friction member against the force of said brake biasing means a distance to allow said friction biasing means to move said friction member into engagement with said clutching surface.

2. A clutch-brake assembly according to claim 1 wherein said brake biasing means exerts an axial force that is greater than the axial force exerted by said friction biasing means.

3. A clutch-brake assembly according to claims 1 or 2 wherein said cam surfaces are generally annular and undulating and lying in a plane generally perpendicular to said axis.

4. A clutch-brake assembly according to claim 3 wherein said undulating cam surfaces tend to cause axial movement of said friction member relative to said output member toward said clutching surface during engagement of said friction surface with said clutching surface to increase the force exerted in an axial direction toward said input member on said friction member by an amount substantially greater than said force exerted by said friction biasing means.

5. A clutch-brake assembly according to claims 1 or 2 wherein: said friction member is a substantially annular member; said friction surface is defined, in part, by in annular angularly disposed surface on said friction member; and said clutching surface is annular and configured to engage said annular friction surface.

6. A clutch-brake assembly according to claim 5 wherein: said friction member has a generally conical configuration in a cross sectional plane passing through said axis; said annular friction surface is on one side of said friction member; said friction surface is further defined by another annular angularly disposed surface on the other side of said friction member; and said braking surface is annular and configured to engage said other annular friction surface.

7. A clutch-brake assembly according to claim 1 or 2 further comprising retaining means disposed along said axis to retain said input and output members in an axial relationship relative to one another and provide for a limited amount of axial movement between said input and output members.

8. A clutch-brake assembly according to claim 7 wherein: said retaining means includes a fastener having a head portion engageable with one of said members and another portion secured to the other of said members, said fastener having a shoulder portion contacting said other of said members and defining a space between said head portion and said other of said members; and said one of said members encircles said shoulder portion and is engageable with said head portion and said other of said members and is movable along said fastener between said head portion and said other of said members to make said engagements.

9. A clutch-brake assembly according to claim 1 or 2 wherein: said output member is annular, and has a cylindrical bearing surface concentric with said axis; and said housing has a cylindrical bearing surface in mating engagement with said cylindrical bearing surface of said output member.

10. A clutch-brake assembly according to claim 9 wherein: said input member is annular, has a centrally disposed axially extending opening for securement to said source for driving rotation and has a cylindrical bearing surface concentric with said axis; and said output member has another cylindrical bearing surface in mating engagement with said cylindrical bearing surface of said input member.

11. A clutch-brake assembly according to claim 10 further including means for securing said input member to said source for driving rotation for one-to-one rotation therebetween and providing for axial movement between said input member and said source for driving rotation.

12. A clutch-brake assembly according to claim 10 wherein: said friction member is annular and of a conical shape in cross section and said friction surface is defined by a pair of spaced angularly disposed annular surfaces; said clutching surface is annular, concentric with said friction member and juxtaposition one of said angularly disposed surfaces; and said braking surface is annular, concentric with said friction member and juxtaposition the other of said angularly disposed surfaces.

13. A clutch-brake assembly according to claim 1 or 2 wherein said oil retained in said housing is in open communication with the oil located within the engine reservoir.

14. A clutch-brake assembly for use with an internal combustion engine having an output shaft rotatable about an axis and an oil reservoir, said assembly comprising: an annular input member encircling said shaft and having an annular clutching surface disposed at an acute angle relative to said axis and an opening for receiving a portion of said shaft; means for providing one-to-one rotation between said input member and said shaft; an annular output member having an output shaft portion with a cylindrical bearing surface; a housing enclosing said members and defining an oil retaining chamber in open fluid communication with said oil reservoir, said housing including a cylindrical bearing surface in mating engagement with said bearing surface on said output shaft portion; an annular brake member disposed within said housing and having an annular braking surface disposed at an acute angle relative to said axis and spaced from said annular clutching surface; a conical ring member interposed between said clutching and braking surfaces and having a pair of spaced annular friction surfaces each disposed at an acute angle for respective mating engagement with said clutching and braking surfaces; means interposed between said ring member and said output member to axially bias said ring member toward said clutching and braking surfaces; and means for moving said brake member axially in a direction opposite to said means interposed between said ring and output members.

15. A clutch-brake assembly according to claim 14 further comprising biasing means to bias said brake member in said axial direction of movement.

16. A clutch-brake assembly according to claim 14 or 15 further comprising self-engaging means interposed between said ring and output members to further engage said clutching and said friction surface after initial engagement therebetween has occurred.

17. A clutch-brake assembly according to claim 14 or 15 further comprising retaining means interposed between said input and output members along said axis to provide for limited axial movement between said input and output members.

18. A clutch-brake assembly according to claim 14 or 15 wherein said shaft portion of said output member extends outside of said chamber and further comprising a blade secured for rotation to said shaft portion.

19. A clutch-brake assembly for use with oil comprising: a housing defining a chamber for retaining oil; a input member located in said chamber, mounted for rotation about an axis and having one or more clutching surfaces; a output member located in said chamber, mounted for rotation about said axis and having one or more cam surfaces; a friction member located in said chamber, having one or more friction surfaces juxtaposition each of said clutching surfaces and a generally annular cam surface engaging each of said cam surfaces of said output member, each set of said cam surfaces being configured to cause axial movement between said friction member and said output member upon relative rotational movement about said axis between said friction member and said output member; means located in said chamber axially biasing said friction member toward said input member and away from said output member to engage said friction and clutching surfaces; a brake member located in said chamber having one or more braking surfaces juxtaposition said friction surface and mounted for axial movement a distance to engage said braking and friction surfaces and move said friction surface out of engagement with said clutching surface; and means to move said brake member away from said friction member a distance to move said braking and friction surfaces out of engagement with one another and to allow said means biasing said friction member to move said friction surface into engagement with said clutching surface.

* * * * *